United States Patent [19]
Foster, Jr.

[11] Patent Number: 4,743,063
[45] Date of Patent: May 10, 1988

[54] CONVERTIBLE MULTI-FUNCTION CHILD RESTRAINT SYSTEM

[76] Inventor: James W. Foster, Jr., 3751 Stokes Ave., Charlotte, N.C. 28210

[21] Appl. No.: 64,098

[22] Filed: Jun. 18, 1987

[51] Int. Cl.⁴ ............................................. A47C 13/00
[52] U.S. Cl. ................... 297/130; 297/250; 297/487
[58] Field of Search ............... 297/250, 254, 130, 488, 297/487, 216

[56] References Cited

U.S. PATENT DOCUMENTS

| | | |
|---|---|---|
| 2,291,640 | 8/1942 | Lee . |
| 2,560,708 | 7/1951 | Titus . |
| 2,720,911 | 10/1955 | Lantz . |
| 3,290,050 | 12/1966 | Ezquerra .......................... 297/130 |
| 3,934,934 | 1/1976 | Farrell, Jr. et al. ................. 297/488 |
| 4,164,357 | 8/1979 | Conachey . |
| 4,271,627 | 6/1981 | Echterling ........................ 297/130 |
| 4,345,791 | 8/1982 | Bryans et al. .................... 297/250 |
| 4,687,255 | 8/1987 | Klanner et al. ................... 297/488 |

Primary Examiner—Francis K. Zugel
Attorney, Agent, or Firm—Bell, Seltzer, Park & Gibson

[57] ABSTRACT

A convertible multi-function child restraint system is provided. The child restraint system comprises a toddler seat adapted to be mounted on the seat of an automobile, the toddler seat including a seat portion and spaced apart armrest portions extending upwardly from opposite sides of said seat portion, the toddler seat thus being adapted to serve as a booster seat in the automobile for a toddler age child, the toddler seat including latch means cooperating with each of the armrest portions thereof, a toddler restraining arm adapted to be mounted between the armrest portions across and above the seat portion when a toddler is positioned in the toddler seat, the toddler restraining arm including respective latch members at opposite ends thereof for detachable connection with the latch means of the armrest portion, an infant carrier positionable in the toddler seat to permit converting the toddler seat for receiving and carrying an infant, the infant carrier including respective latch members on opposite sides thereof for detachable connection with the latch means of the armrest portions to thereby permit easily removing the infant carrier for use in carrying an infant outside of the automobile.

19 Claims, 4 Drawing Sheets

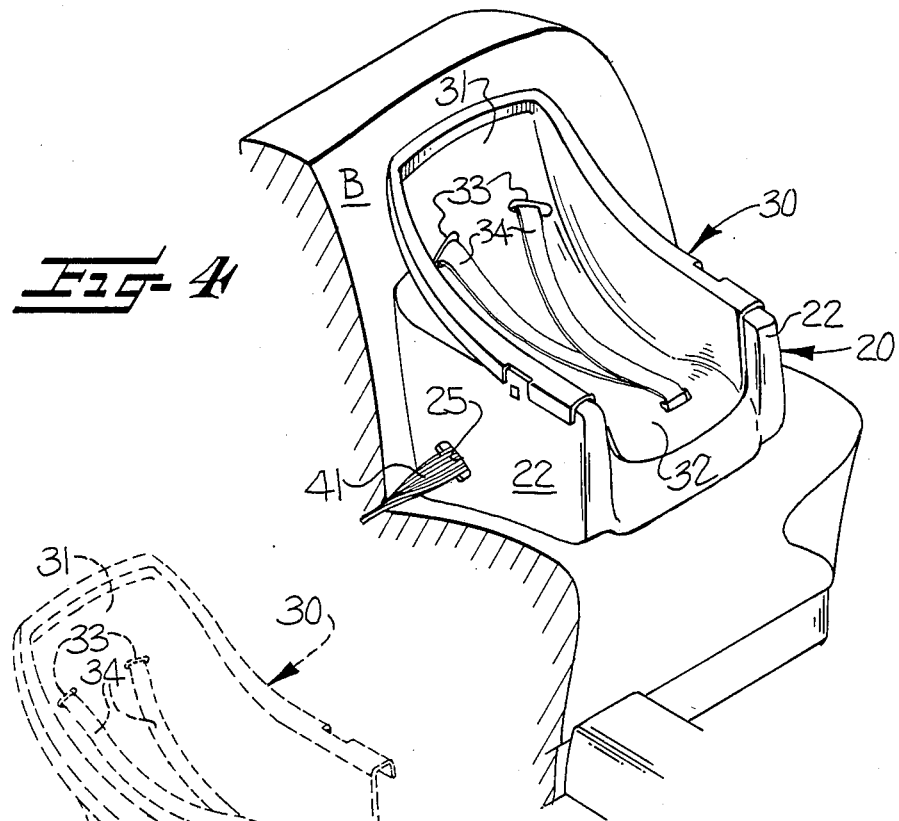
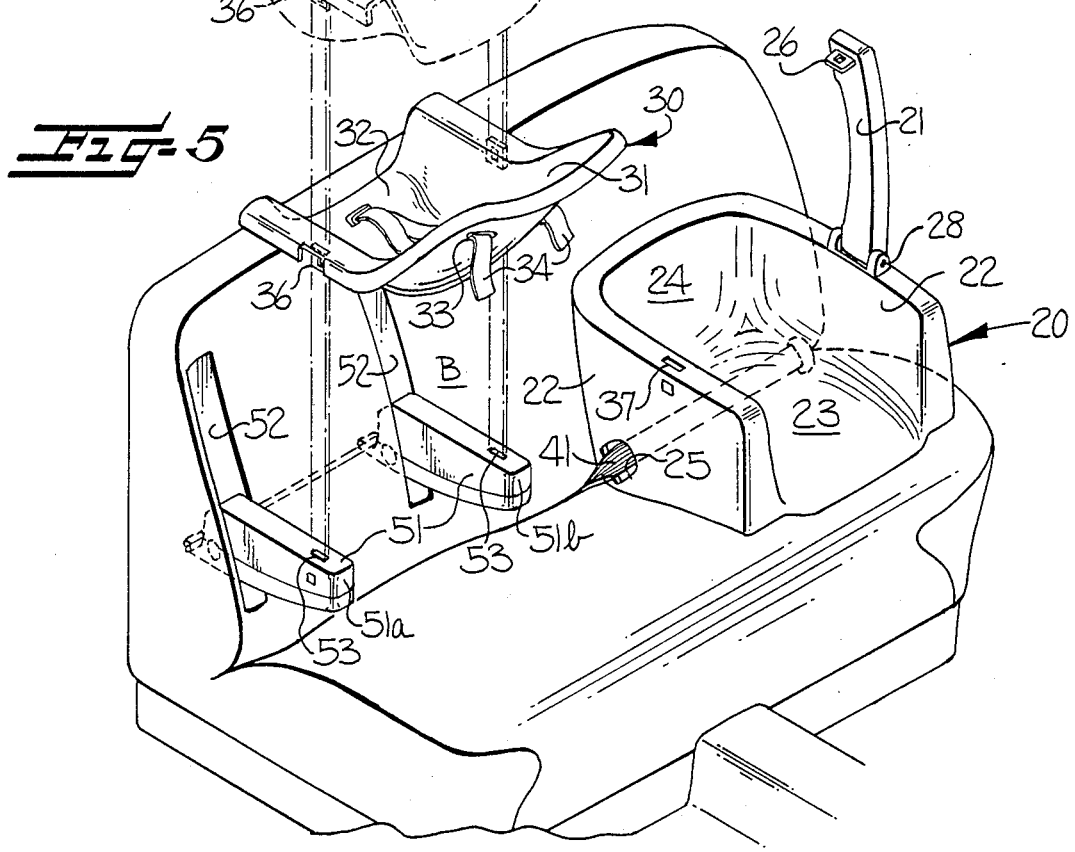

CONVERTIBLE MULTI-FUNCTION CHILD RESTRAINT SYSTEM

BACKGROUND OF THE INVENTION

This invention relates to a convertible multifunction child restraint system. More particularly, this invention relates to a child restraint which is convertible from an infant seat to toddler seat and which avoids the necessity of a parent buying several different child restraint devices in order to fit the child as he grows from an infant to a toddler.

The restraint of children in moving automobiles is a major concern of parents and auto safety groups. In the last ten years state and federal safety regulations have become stricter and more strongly enforced. Thus various designs for child restraint devices are currently available; however, most of these devices only fit either an infant or a toddler and not both, and several devices must be purchased as the child grows.

U.S. Pat. No. 4,345,791 to Bryans et al discloses a child car seat which includes a bolster having a base portion which is mounted on a car seat cushion and a child seat adapted to be mounted on the base or directly on the car seat. The base serves no function other than to serve as a means on which the child seat can be mounted. Further exemplary devices are disclosed in U.S. Pat. Nos. 2,291,460 to Lee, 2,560,708 to Titus, and 4,164,357 to Conachey. This group of patents disclose various child car seats which restrain a child. However, use of these devices are limited in that the seat only fits one size child and the parent would be required to purchase several devices as the child grows.

A particularly advantageous feature of the present invention is that it is able to securely fit an infant up to thirty pounds in an infant carrier, and it can then be converted to a toddler seat for a child from about thirty to sixty pounds. Thus, the present invention is more adaptable and versatile than the automobile seats disclosed in the art. Moreover, the subject invention offers a significant cost savings in that a parent only needs to purchase one child care device that will fit the child for as long as a child restraint device is necessary.

SUMMARY OF THE INVENTION

In accordance with the present invention, applicant provides a child restraint system which eliminates the need to purchase multiple child restraint devices as the child grows from an infant to a toddler. To this end, the restraint system comprises a toddler seat, serving as a booster seat for a toddler age child, and adapted to be mounted on a car seat and an infant carrier which can be releasably secured to the toddler seat so as to convert the toddler seat for holding an infant. The armrest portions of the toddler seat include latch means for receiving a restraint arm to securely hold the toddler in the toddler seat. The infant carrier is positionable in the toddler seat, and through latch members on opposite sides of the infant carrier, can be detachably connected with the latch means of the armrest portions of the toddler seat to allow for the easy removal of the infant carrier for use outside of the automobile. The infant carrier, when removed from the toddler seat, may be detachably secured to other supports which convert the infant carrier into a stroller, chair, or the like.

BRIEF DESCRIPTION OF THE DRAWINGS

Some of the features and advantages of the invention having been stated, others will become apparent from the detailed description which follows, and from the accompanying drawings, in which—

FIG. 4 is a perspective view of another embodiment of the present invention wherein the infant carrier is installed facing forward;

FIG. 5 is an exploded perspective view of another embodiment of the present invention wherein the infant carrier is disposed on support members recessed in the backrest portion of the automobile seat;

DETAILED DESCRIPTION OF THE INVENTION

Figures 1, 2, 3:
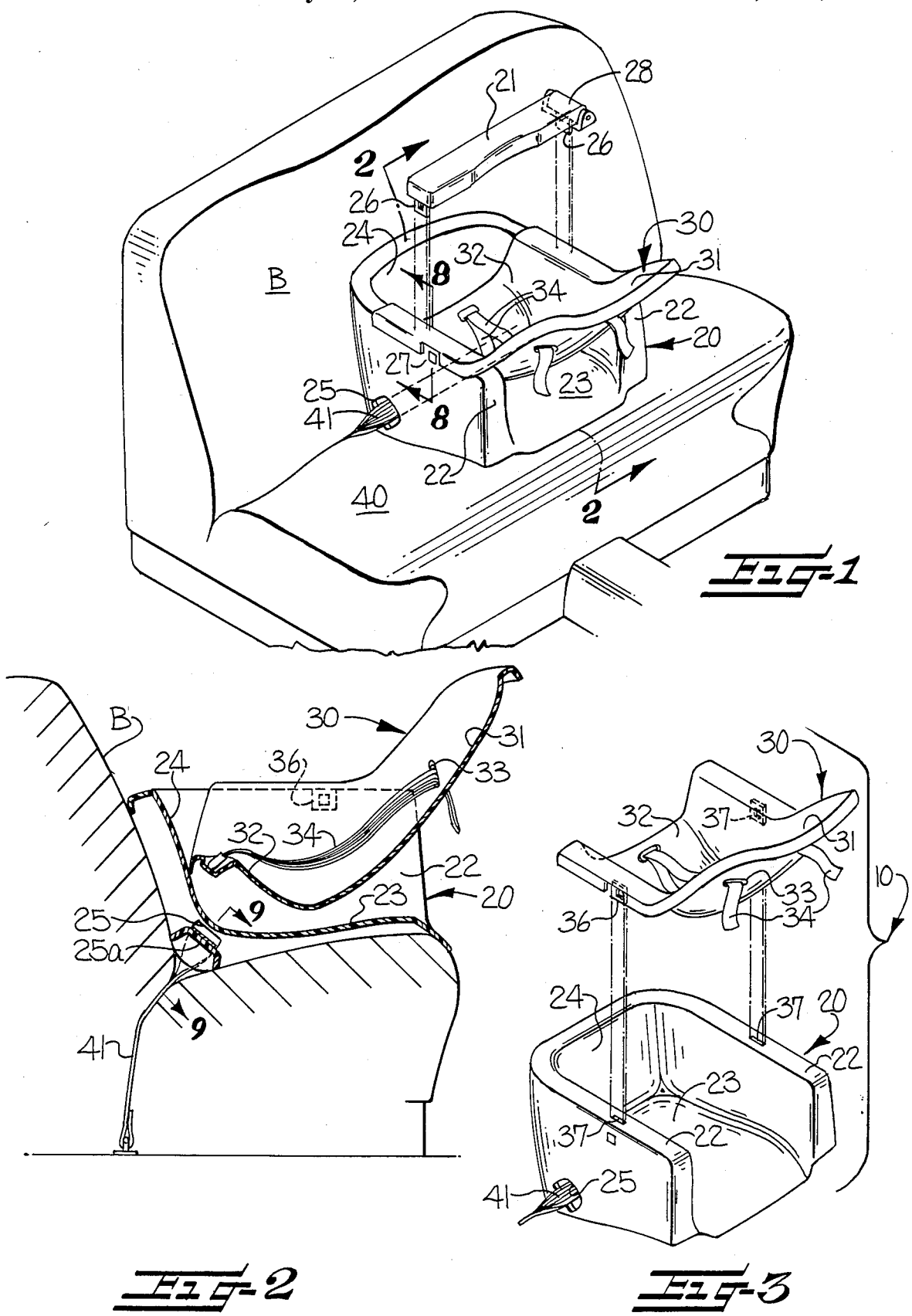
FIG. 1 is a perspective view of an embodiment of the present invention with the infant carrier installed facing rearward.
FIG. 2 is a longitudinal section view taken along line 2—2 of FIG. 1.
FIG. 3 is an exploded perspective view illustrating how the infant carrier is mounted on the toddler seat.

The present invention now will be described more fully hereinafter with reference to the accompanying drawings, in which preferred embodiments of the invention are shown. This invention can, however, be embodied in many different forms and should not be construed as limited to the embodiments set forth herein; rather, applicant provides these embodiments so that this disclosure will be thorough and complete, and will fully convey the scope of the invention to those skilled in the art.

As illustrated in the Figures, the convertible multifunction child restraint system, generally indicated by the reference numeral 10, comprises in combination, a toddler seat 20 adapted to be mounted on an automobile seat 40, a toddler restraining arm 21 mounted between armrest portions 22 of the toddler seat 20, and an infant carrier 30 positionable in the toddler seat 20. Turning now to the specific aspects of the restraint system, the present invention will be discussed in detail hereinafter.

As shown in FIGS. 1 to 5, the toddler seat 20 is preferably of a unitary construction and is molded from a lightweight rigid material such as plastic. The toddler seat 20 is defined by a seat portion 23 and spaced apart armrest portions 22 extending upwardly from opposite sides of the seat portion 23. The toddler seat 20 also includes a backrest portion 24 extending upwardly from the seat portion 23 and generally perpendicular to the armrest portions 22. The spacing between the armrest portions is a function of the maximum width of a two year old or older toddler which is about 20 inches. This permits the toddler seat 20 to function as a booster seat for a toddler age child ranging from about thirty to sixty pounds.

Figure 9:
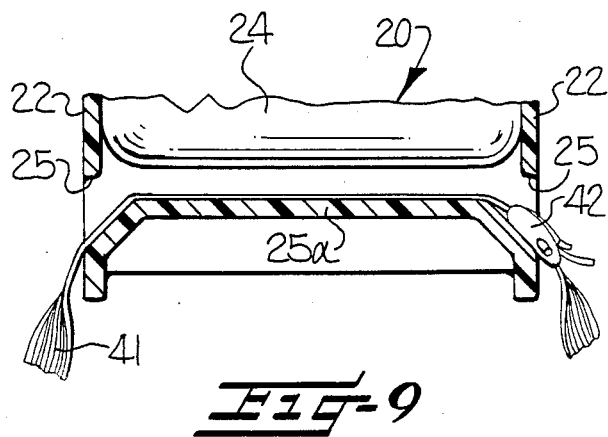
FIG. 9 is a transverse sectional taken along line 9—9 of FIG. 2 illustrating the securement of the toddler seat with the automobile seat belt.

As shown in FIG. 9, the toddler seat 20 additionally includes a pair of opposing apertures 25 molded into the sides of the armrest portions 22. These apertures 25 receive an automobile seat belt 41 which passes through the apertures 25 and is buckled to the automobile seat belt buckle 42 so as to snugly secure the seat belt 41 flush against a bridging seat belt support member 25a of the toddler seat 20 thereby tightly securing the toddler seat 20 to the automobile seat 40.

As illustrated in FIGS. 1 and 5, a toddler restraining arm 21 is adapted to be mounted between the armrest portions 22 and above and across the seat portions 23 of the toddler seat 20. The arm 21 includes latch members 26 at opposite ends of the arm 21 for detachable connection with latch means 27 connected to opposite armrest portions of the toddler seat 20 as shown in FIG. 1 or FIG. 5. An exemplary latch member and latch means configuration is the type of latching mechanism conventionally used in automobile seat belt buckles. The restraining arm 21 can be permanently or temporarily pivotably mounted on one end of the armrest portion by a pivot joint 28 to permit upward pivotal movement of the arm 21 to an open position as in FIG. 5 while maintaining the connection of the restraint arm 21 to the armrest portion 22 of the pivot point.

The infant carrier 30 is molded from a lightweight rigid material such as plastic. The infant carrier includes a backrest portion 31 and a footrest portion 32 which together define a seat portion. The infant carrier 30 is contoured to the body of an infant so that an infant up to thirty pounds in weight will fit securely in the infant carrier 30. It is typically lined with a soft, shock resistant material such as foam rubber so as to provide additional protection to the infant. Additionally the infant carrier may include apertures 33 which receive harness means 34 to secure the infant in the infant carrier during use.

Figure 8:
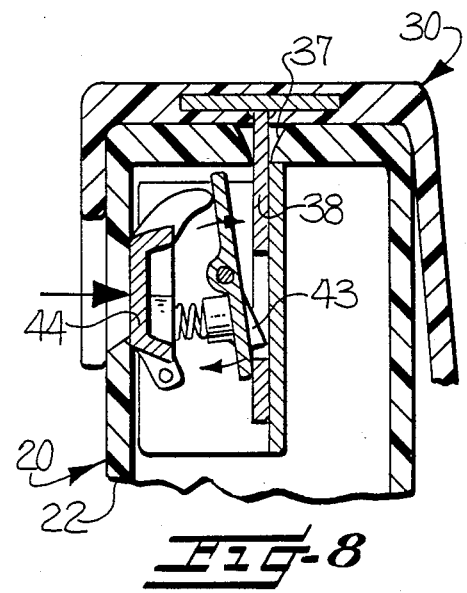
FIG. 8 is a transverse section view taken along line 8—8 of FIG. 1 illustrating the construction of the latching member and latching means.

The infant carrier 30 is adapted to be positionable in the toddler seat by having latch members 36 on opposite sides of the infant carrier 30 capable of being detachably connected with latch means 26 located on the armrest portion 22 of the toddler seat 20. The infant carrier 30 may be positioned in the toddler seat 20 to orient the child facing rearward as in FIG. 1 which is typically required by regulation for a child less than twenty pounds, or to orient the child facing forward as in FIG. 4, which is desired for an infant weighing between twenty to thirty pounds. An exemplary latch member and means configuration is the type of latching mechanism utilized in a conventional seat belt buckle, and is illustrated in FIG. 8. The latch member 37 is insertably received in an opening 38 molded in the toddler seat and is engaged by a latch member 43 thereby locking the infant carrier 30 in place on the toddler seat 20. The infant carrier can be removed from the toddler seat by pressing release means 44 so as to disengage the latch member from the latch means and permit the infant carrier 30 to be lifted from the toddler seat. It is recognized that this arrangement can be reversed, namely the latch means can be attached to the infant carrier 30 and the latch member attached to the toddler seat 20.

Figure 7:
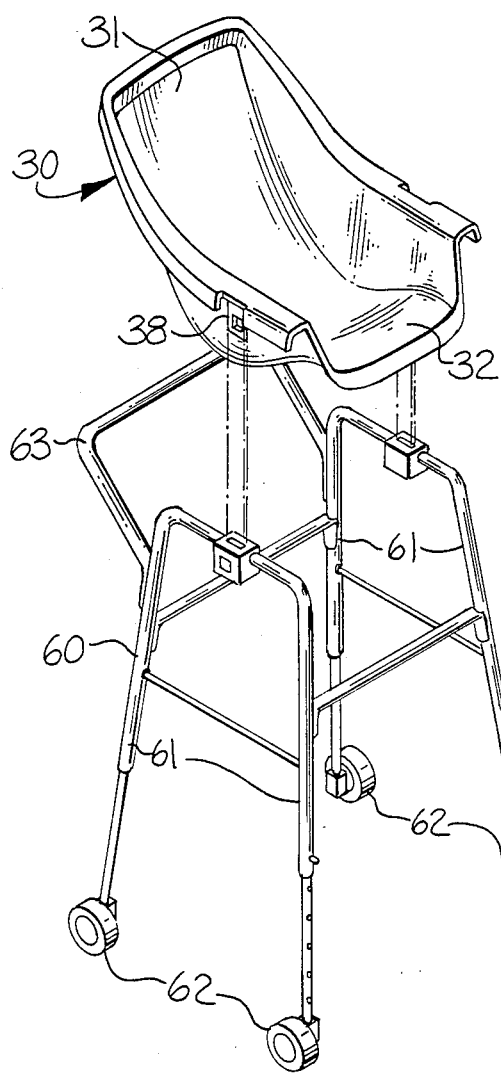
FIG. 7 is a perspective view of the infant carrier illustrating its cooperation with a stroller base.

The infant carrier 30 can be adapted to be positionable on other bases when removed from the toddler seat 20. As shown in FIG. 7, the infant carrier may be mounted on a base 60 having legs 61 to form a high chair. The chair may include permanently or removable wheels 62 and a push handle 63 which permits the base with legs to be used as a stroller.

Figure 6:
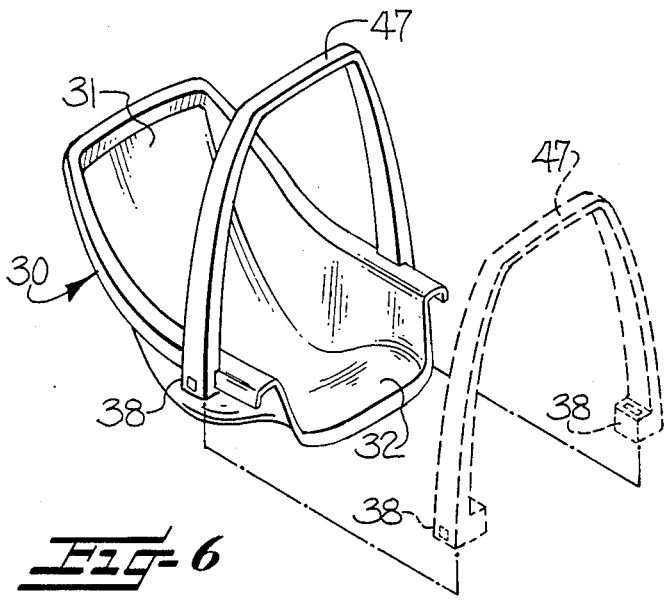
FIG. 6 is a perspective view of the infant seat with a detachable carrying handle connected thereto.

As shown in FIG. 6, the infant carrier 30 can also include a carrying handle 47 which is removably attached to the infant carrier by molding latch means 38 into the ends of the handles 47 which can be detachably connected to the latch members 36 on opposite sides of the infant carrier 30. The carrying handle 47 may also be permanently attached. Additionally, the handle 47 is of dimensions substantially corresponding to that of the backrest portion 31 or the footrest portion 32 so that the carrying handle 47 can be stowed adjacent the exterior surface of either of these portions. The carrying handles 47 also may be retractable and received in hollow portions of the backrest portion 31 or footrest portion 32.

Referring to FIG. 5 illustrating an alternate embodiment, the infant carrier 30 when removed from the toddler seat 20 can be mounted on support arms 51 pivotably mounted in the car seat backrest B. The support arms 51a, 51b are disposed in recesses 52 in the backrest B when not in use. The support arms have latch means 53 at the same location as those of the toddler seat so that the infant carrier 30 is easily positionable on the support arms 51a, 51b. The ability to mount the infant carrier in this manner greatly facilitates the use of the car when there are two small children in the family in that the older child may use the toddler seat 20 and the newborn may use the infant carrier simultaneously.

Figure 10:
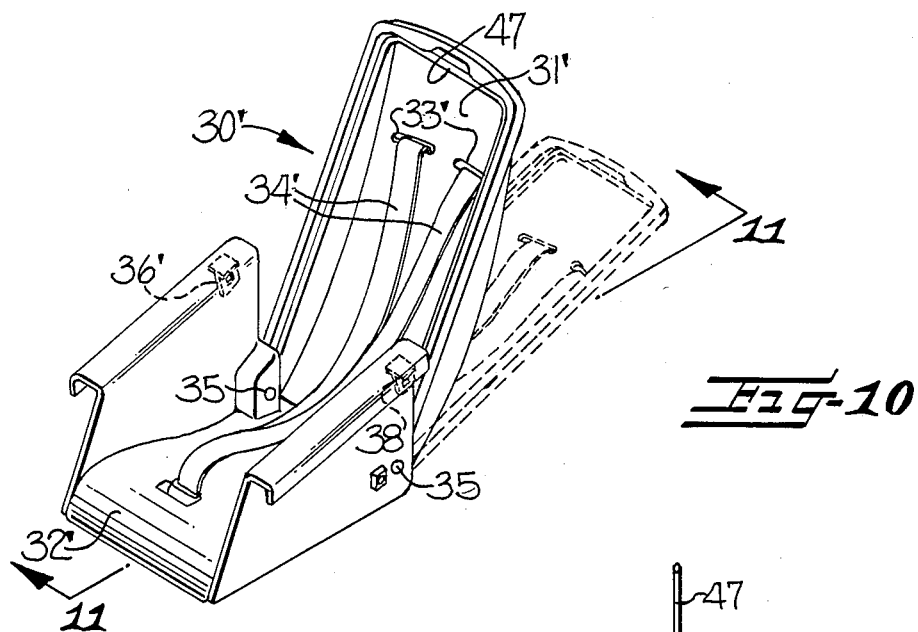
FIG. 10 is a perspective view of another embodiment of the present invention wherein the infant carrier includes pivotably interconnected footrest and backrest portions.
Figure 11:
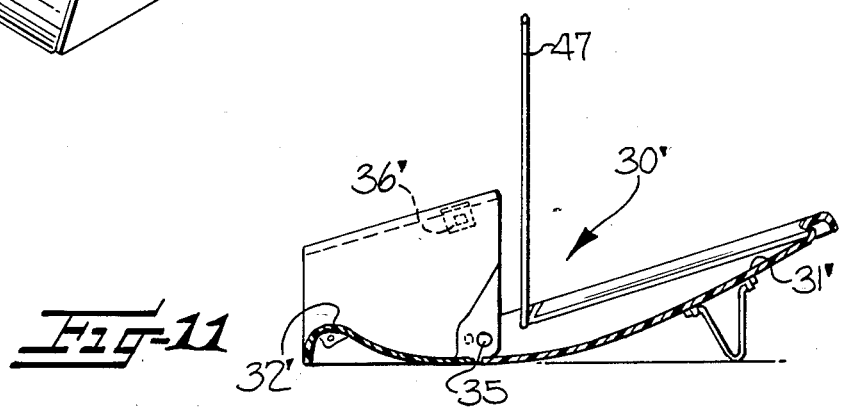
FIG. 11 is a longitudinal section view taken along line 11—11 of FIG. 10.
Figure 12:
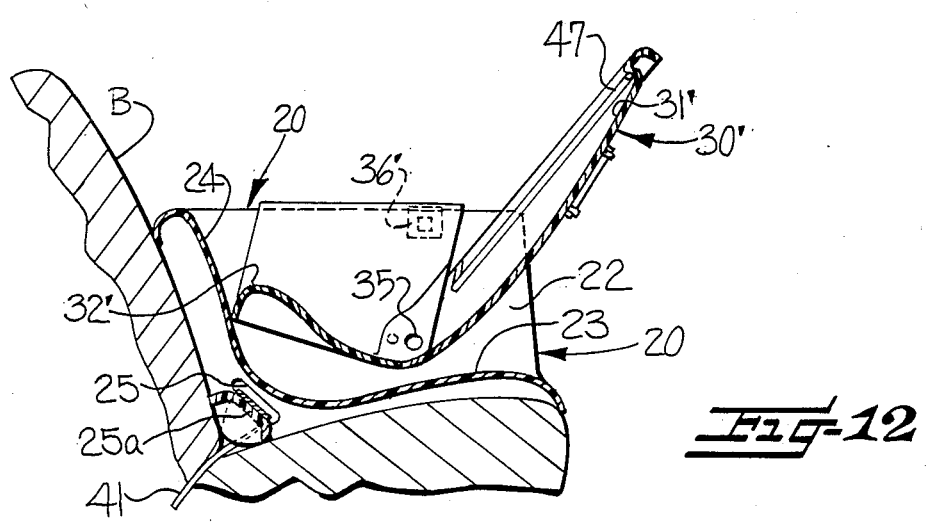
FIG. 12 is a sectional view similar to FIG. 2 showing a pivotable infant carrier mounted on the toddler seat.

An alternative embodiment 30' of the infant carrier is shown in FIG. 10 and FIG. 11. To avoid repetitive description, elements of the carrier which are similar to those previously shown and described have been designated with the same reference characters with prime notation added. This embodiment differs over that of the previous embodiments primarily in that the backrest portion 31' and the footrest portion 32' are pivotally interconnected by a pivot joint 35. The pivot joint 35 permits the footrest and backrest portions to be adjustable oriented with respect to each other, thereby allowing the uses of the pivotable infant carrier 30' to range from being utilized as a seat with the child in a sitting position to being utilized as a bassinet with a child in a prone position.

The convertible multi-function restraint system of the present invention is more adaptable and versatile than currently available child restraint devices. The present restraint system is adapted to be able to fit an infant up to thirty pounds in the infant carrier positionable in the toddler seat, and a child from thirty to sixty pounds in the toddler seat when used alone. Thus the parent need only purchase one restraint system which will fit the child for as long as a child restraint device is necessary, a tremendous cost savings for parents.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A convertible multi-function child restraint system comprising, in combination:

a toddler seat adapted to be mounted on the seat of an automobile, said toddler seat including a seat portion and spaced apart armrest portions extending upwardly from opposite sides of said seat portion, said toddler seat thus being adapted to serve as a booster seat in the automobile for a toddler age child, said toddler seat including latch means cooperating with each of said armrest portions thereof;

a toddler restraining arm adapted to be mounted between said armrest portions across and above said seat portion when a toddler is positioned in the toddler seat, said toddler restraining arm including respective latch members at opposite ends thereof for detachable connection with the latch means of said armrest portions; and an infant carrier positionable in said toddler seat to permit converting the toddler seat for receiving and carrying an infant, said infant carrier including respective latch members on opposite sides thereof for detachable connection with the latch means of said armrest portions to thereby permit easily removing the infant carrier for use in carrying an infant outside of the automobile.

2. A convertible multi-function child restraint system according to claim 1, wherein said toddler seat includes aperatures molded into side portions of the toddler seat for receiving an automobile seat belt to thereby secure the toddler seat to the automobile seat.

3. A convertible multi-function child restraint system according to claim 1, including pivotal mounting means cooperating with one end of said toddler restraining arm to permit movement of the restraining arm to an open position while maintaining the latch member at said one end of the restraining arm connected to said current position.

4. A convertible multi-function child restraint system according to claim 1, wherein said infant carrier includes harness means to secure an infant in said carrier during use.

5. A convertible multi-function child restraint system according to claim 1, wherein said infant carrier is positionable in said toddler seat so as to orient the infant facing forward or rearward.

6. A convertible multi-function child restraint system according to claim 1, wherein said infant carrier includes a backrest portion, a footrest portion, and means pivotally interconnecting said backrest portion and said footrest portion so as to permit adjustably orienting the backrest and footrest portions with respect to one another.

7. A convertible multi-function child restraint system according to claim 1, wherein said infant carrier includes a detachable carrying handle.

8. A convertible multi-function child restraint system according to claim 7, wherein the dimensions of said handle substantially correspond to at least one of the backrest or footrest portions of said infant carrier so that when said handle is not in use it can be stowed adjacent the exterior surface of the backrest portion or footrest portion.

9. A convertible multi-function child restraint system according to claim 1, additionally including a base, separate from said toddler seat, upon which said infant carrier can be positioned when the infant carrier is removed from said toddler seat, said base having latch means for detachable connection with respective latch members of said infant carrier.

10. A convertible multi-function child restraint system according to claim 9, wherein said base includes leg members attached to the bottom portion thereof so that the base may function as a chair when said infant carrier is attached thereto.

11. A convertible multi-function child restraint system according to claim 9, wherein said base includes leg members attached to the bottom portion of said base and wheels attached to said leg members so that the base may function as an infant stroller when said infant carrier is attached thereto.

12. A convertible multi-function child restraint system according to claim 9 wherein said base comprises pivotably mounted support arms disposed in recesses of the backrest portion of an automobile seat.

13. A convertible multi-function child restraint system comprising, in combination:

a toddler seat adapted to be mounted on the seat of an automobile, said toddler seat including a seat portion and spaced apart armrest portions extending upwardly from opposite sides of said seat portion, said toddler seat thus being adapted to serve as a booster seat in the automobile for a toddler age child, said toddler seat including latch means cooperating with each of said armrest portions thereof and said toddler seat additionally includes apertures molded into side portions of the toddler seat for receiving an automobile seat belt to thus secure the toddler seat to the automobile seat;

a pivotable toddler restraining arm adapted to be mounted between said armrest portions across and above said seat portion when a toddler is positioned in the toddler seat, said toddler restraining arm including respective latch members at opposite ends thereof for detachable connection with the latch means of said armrest portions and including pivotable mounting means cooperating with one end of the restraining arm to permit movement of the restraining arm to an open position while maintaining the latch member at said one end of the restraining arm connected to said armrest portion; and an infant carrier positionable in said toddler seat for converting the toddler seat to receive and carry an infant, said infant carrier including harness means to secure the infant in said carrier during use and including respective latch members on opposite sides thereof for detachable connection with the latch means of said armrest portions to thereby permit easily removing the infant carrier for use in carrying an infant outside of the auto- mobile.

14. A convertible multi-function child restraint system according to claim 13, wherein said infant carrier is positionable in said toddler seat so as to orient the infant facing forward or rearward.

15. A convertible multi-function child restraint system according to claim 13, additionally including a base, separate from said toddler seat, upon which said infant carrier can be positioned when the infant carrier is removed from said toddler seat, said base having latch means for detachable connection with respective latch members of said infant carrier.

16. A convertible multi-function child restraint system according to claim 15, additionally including a base, separate from said toddler seat, upon which said infant carrier can be positioned when the infant carrier is removed from said toddler seat, said base having latch means for detachable connection with respective latch members of said infant carrier.

17. A convertible multi-function child restraint system according to claim 15, wherein said base includes leg members attached to the bottom portion thereof so that the base may function as a chair when said infant carrier is attached thereto.

18. A convertible multi-function child restraint system according to claim 15 wherein said base comprises pivotably mounted support arms disposed in recesses of the backrest portion of an automobile seat.

19. A convertible multi-function child restraint system according to claim 13, wherein said infant carrier includes a backrest portion, a footrest portion, and means pivotally interconnecting said backrest portion and said footrest portion so as to permit adjustably orienting the backrest and footrest portions with respect to one another.

* * * * *